United States Patent [19]

Taylor

[11] Patent Number: 4,853,055
[45] Date of Patent: Aug. 1, 1989

[54] FLUSH GLASS INSTALLATION PROCESS

[75] Inventor: Edward F. Taylor, Laguna Miguel, Calif.

[73] Assignee: General Motors Corporation, Detroit, Mich.

[21] Appl. No.: 217,992

[22] Filed: Jul. 11, 1988

[51] Int. Cl.4 .................................................. B60J 1/00
[52] U.S. Cl. ...................................... 156/108; 52/208; 156/295; 156/344; 296/84.1; 296/93
[58] Field of Search .................. 52/208, 400; 156/108, 156/295, 344; 296/84.1, 93

[56] References Cited
U.S. PATENT DOCUMENTS

| | | | |
|---|---|---|---|
| 3,387,416 | 6/1968 | Martin | 52/208 |
| 3,575,463 | 4/1971 | Kolevas | 296/93 |
| 3,925,947 | 1/1974 | Meyers et al. | 52/208 |
| 3,968,612 | 1/1975 | Endo et al. | 52/400 |
| 4,165,119 | 8/1979 | Hedeen et al. | 296/93 |
| 4,434,593 | 3/1984 | Horike et al. | 52/208 |
| 4,571,278 | 2/1986 | Kunert | 156/108 |

*Primary Examiner*—Robert A. Dawson
*Attorney, Agent, or Firm*—William A. Schuetz

[57] ABSTRACT

A method for installing a fixed window on an automotive vehicle in which the window is adhesively secured by an adhesive, preferably uncured butyl rubber, within a trough defined by the body structure of the vehicle and in a manner such that the window is flush with the adjacent exterior surfaces of the body structure.

4 Claims, 1 Drawing Sheet

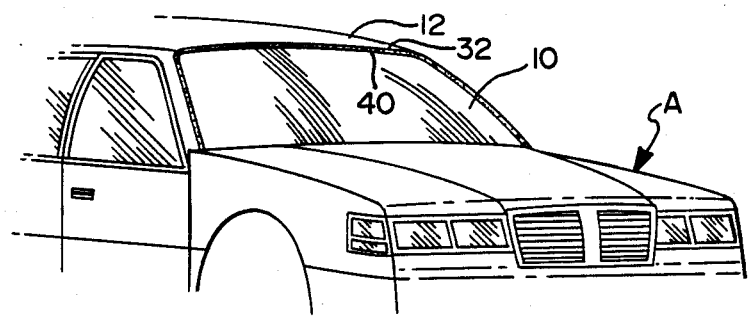
FIG 1
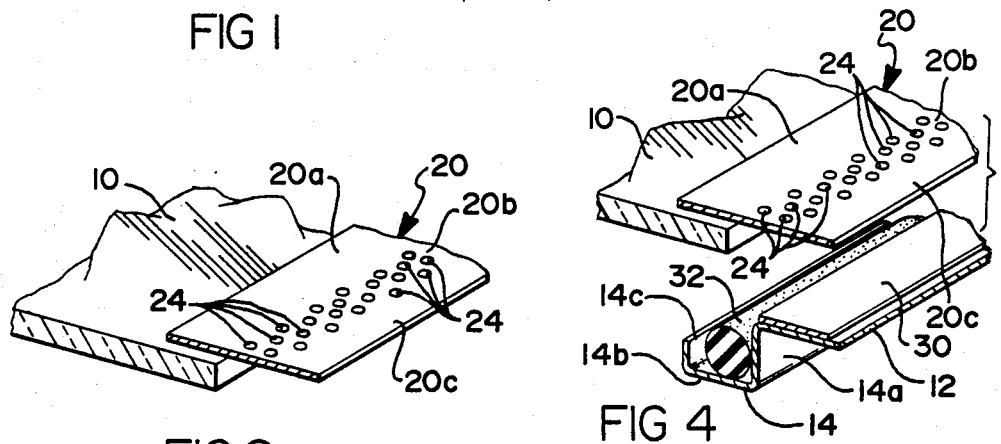
FIG 2
FIG 4
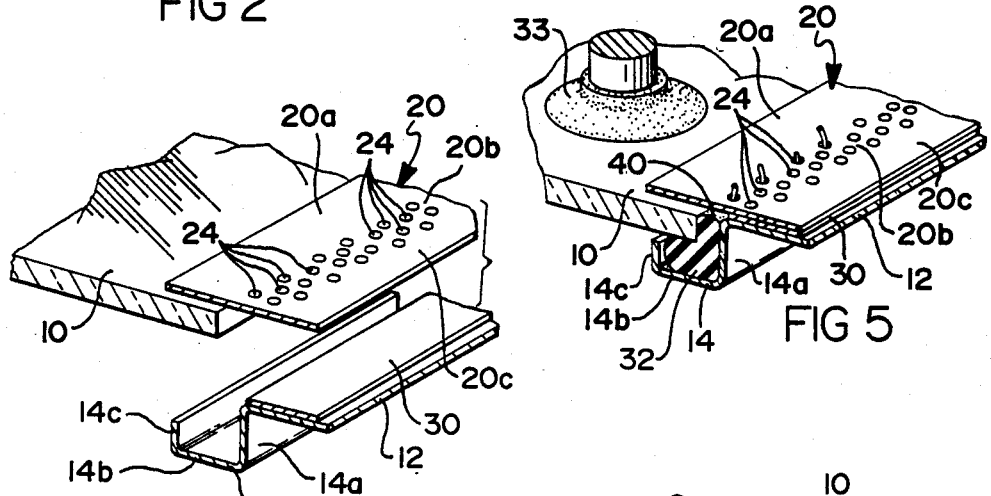
FIG 3
FIG 5
FIG 6

FLUSH GLASS INSTALLATION PROCESS

The present invention relates to a method for installing a fixed vehicle window and, more particularly, to a method for installing a fixed window to a vehicle body so that the window is both securely fixed to the body and is flush therewith.

One of the conventional ways of installing a window to vehicle body structures so that the window is fixed therewith is to stamp the body structure so as to define a trough which surrounds the window opening and is shaped complementary with the shape of the window. To secure the window, the window is placed over the opening and a curable adhesive, such as butyl rubber in an uncured state, is either positioned within the trough prior to placing the window therein or injected thereafter and allowed to cure. A dam is usually provided at the inner edge of the trough to prevent or minimize flow of the butyl rubber along the inside of the window and a reveal molding in the shape of a "Christmas tree" is inserted into the trough to span the distance between the outer edge of the window and the painted surface of the vehicle adjacent the trough. The Christmas tree has a stem which is serrated and when press fitted within the uncured adhesive in the trough provides an upward barrier to prevent the adhesive to flow along the outside of the glass and along the painted surface of the adjacent vehicle body structure. When the adhesive cures it firmly adheres to the glass and around the Christmas tree and trough to secure the window glass in place. This type of structure is shown and disclosed in U.S. Pat. No. 4,165,119, assigned to the same assignee as the present invention.

While the use of a Christmas tree and adhesives, such as uncured butyl rubber, has been highly successful in operation, it nevertheless does not allow for the window to be completely flush with the adjacent painted body or roof structure of the vehicle.

In accordance with the provisions of the present invention, a fixed glass installation process is provided in which the glass is adhesively secured by an adhesive, preferably uncured butyl rubber, within a trough defined by the body structure of the vehicle and in a manner in which the window is flush with the adjacent exterior surfaces of the body structure or roof. In addition, the installation process of the present invention prevents flow of uncured butyl rubber onto the outer surface areas of the glass and/or roof structure and so that the outer surface of the uncured butyl rubber will be flush with the glass and the adjacent body or roof structure.

Accordingly, it is an important object of the present invention to provide a new and improved fixed vehicle window glass installation process which is simple to use, is economical and which provides a flush appearance between the window glass and the adjacent exterior body structure and without any uncured adhesive or butyl rubber flowing onto the adjacent exterior glass or body structure.

Another object of the present invention is to provide a new and improved fixed window glass installation process, as defined in the next preceding object, and in which flushness between the window glass and the adjacent exterior body or roof structure of the vehicle can be readily achieved, and in which the installation process does not require the use of any decorative or Christmas tree reveal molding to span the gap between the body structure and the adjacent side edge of the window glass.

A further object of the present invention is to provide a new and improved flush window glass installation process, as defined in the preceding objects, and in which the process includes the steps of providing a tape having an inner portion with an adhesive on one side, an outer portion with an adhesive on one side and a midportion having a multiplicity of perforations therethrough and a parting agent on one side located between the inner and outer portions, adhesively securing the inner portion of the tape to the outer edge portions of the window and with the perforated mid and outer portions overhanging the outer edge portions of the window, adhesively securing a second adhesive tape to the body structure around a trough in which the window glass is to be secured, placing a tacky elastomeric adhesive material, such as uncured butyl rubber, which is adherent to glass and metal in the trough, positioning the window glass in the trough and against the elastomeric material, pressing the outer portion of the tape against the second tape and with the perforated midportion allowing air and any excess adhesive or butyl rubber to pass therethrough, and removing the first tape after the adhesive elastomeric material cures and then the second tape whereby the window glass is adhesively secured to the trough and is flush with the adjacent portions of the outer vehicle body structure.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 1 is a fragmentary perspective view of an automotive vehicle having a windshield which is secured to the body structure of the vehicle in accordance with the provisions of the present invention; and FIGS. 2-6 illustrate the process steps for installing the windshield to the vehicle shown in FIG. 1 in accordance with the provisions of the present invention.

The present invention provides a novel method for installing a fixed window glass to vehicle body structure and s that the window at its exterior side will be flush with the adjacent body structure or roof of the vehicle. The fixed window could be either a windshield, rear window, or side window of the vehicle and is shown for illustrative purposes in FIG. 1 as the windshield 10 of a vehicle A.

Referring to FIGS. 2-6, the novel method for installing the windshield 10 to the body structure 12 of the vehicle A is thereshown. The vehicle body structure 12 would be stamped sheet metal which is provided with a trough 14 which would surround a window opening in the body structure 12. The trough 14 has an inwardly extending outer side wall 14a which extends transversely of the remainder of the body structure 12, a planar bottom wall 14b which extends normal to the outer side wall 14a and an inner side wall or dam 14c which extends upwardly from the bottom wall 14b and is normal thereto. The height of the inner side wall 14c would be less than the height of the outer side wall 14a. It will, of course, be understood by those skilled in the art that instead of providing an inner side wall 14c a separately formed dam which is attachable to the bottom wall 14b could be provided if desired.

The windshield 10 would be shaped complementary with the opening defined by the trough 14 and would have its side edges spaced somewhat inwardly from the outer wall 14a of the trough 14.

The novel method for installing the windshield 10 within the trough 14 of the body structure 12 of the vehicle A will now be described. The first step in the process is to provide a suitable tape 20 having an inner portion 20a, a midportion 20b and an outer portion 20c. The inner portion 20a of the tape 20 would have a suitable adhesive applied to its underside as would the outer portion 20c. The midportion 20b of the tape is perforated, as indicated by reference numeral 24, and has a suitable parting agent applied to its underside which does not adhere to an elastomeric material, such as butyl rubber, when in contact therewith. The tape 20 would extend along the upper, bottom and sides of the windshield 10 and could be formed or die cut so that its shape is complementary with the shape of the windshield 10. The tape 20 is first secured to the windshield 10 by adhesively securing the inner portion 20a thereof to the outer edge portions of the windshield 10 by pressing the same against the windshield 10, as shown in FIG. 2.

The next step would be to adhesively attach a second tape 30, such as masking tape, to the body structure 12 adjacent the trough 14, as shown in FIG. 3. Alternately, the second adhesive tape 30 could be applied to the body structure 12 prior to adhesively attaching the tape 20 to the windshield 10.

As shown in FIG. 4, the next step is to place a bead of a suitable elastomeric adhesive material 32 within the trough 14. As is conventional, the bead 32 would preferably be a butyl rubber in its uncured and pliable state which is merely placed within the trough 14. The curable adhesive could also be like that disclosed in U.S. Pat. No. 4,165,119.

As best shown in FIG. 5, the next step would be to position the glass 10 over the trough 14 on the vehicle body structure 12, and in a manner well known to those skilled in the art. For example, the glass could be held by a holding fixture having suction cups 33 and positioned over the trough 14 and then into the trough.

As the glass 10 is positioned over the trough 14 and moved therein, its outer edge portions engage the uncured adhesive butyl rubber bead 32 and causes the same to be deformed and flow into the space between the side edge portions of the glass 10 and the wall 14a of the trough 14 and to flow in the trough along the inside edge portions of the glass and against the dam 14c. Prior to the window 10 being lowered all the way into the trough 14, the tape 20 would be adhesively secured to the tape 30. That is, the outer edge portion 20c of the tape would be pressed and adhesively secured to the tape 30 along the body structure 12. As the window 10 is being fully lowered within the trough 14 with the outer edge portion 20c of the tape 20 being secured to the tape 30, the uncured adhesive butyl rubber 32 will continue to be flowed into the space between the side edge of the window 10 and the wall 14a of the trough 14. Any air trapped underneath the tape 20 will escape and pass through the perforations 24 in the tape 20 so as to allow the adhesive 32 to freely flow into that space. In addition, any excess adhesive butyl rubber 32 will be caused to flow through the perforations 24 so that the adhesive 32 will form a flush outer surface 40 with the underside of the tape 20 and hence, also be flush with the window 10 and the body structure 12.

The adhesive butyl rubber 32 is then allowed to cure or set through its curing cycle. When sufficiently set, the holding fixture for the glass can be removed. Thereafter, the tape 20 is removed from the glass 10 and from the tape 30. The tape 20 readily allows itself to be removed from the cured adhesive butyl rubber 32 because its midportion 20b in contact therewith had a parting agent on its underside which allows it to readily separate from the butyl rubber 32. Thereafter, the second tape 30 can be removed from the body structure 12.

As can be best seen in FIG. 6, the final end result is that the butyl rubber 32 has been deformed so as to completely fill the space between the side edge of the window 10 and the side 14a of the trough and to securely engage the underside of the window 10. The butyl rubber 32 provides a good strong adhesive bond between the window 10 and the metal trough 14 to securely retain the windshield 10 in place. In addition, the outer side 40 of the butyl rubber 32 is located flush with the exterior surface of the window 10 and the exterior surface of the body structure 12 of the vehicle A so that a completely flush installation is provided.

It will, of course, be understood by those skilled in the art that instead of placing the uncured butyl rubber bead 32 in the trough prior to positioning the windshield 10 therein, that the windshield 10 could be positioned within the trough first and the butyl rubber injected into the trough and allowed to cure after such positioning. In either event, air trapped in the trough will pass through the perforations 24 and any excess butyl rubber 32 will pass through the perforations 24.

From the foregoing, it should be apparent that a novel, simple, economical, fixed glass installation method or process has been provided in which window glass is completely flush with the exterior body structure of the vehicle and which will provide a good adhesive bond to the body structure.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In a method for adhesively installing a fixed window to vehicle body structure which defines a window opening and a trough around the periphery of the opening for receiving adjacent edge portions of the window comprising the steps of:
   a. providing a tape having an inner portion with an adhesive on one side, an outer portion with an adhesive on one side and a midportion having a multiplicity of perforations therethrough and a parting agent on one side located between the inner and outer portions,
   b. adhesively securing the inner portion of said tape to the outer edge portions of the window and with the perforated inner portion and outer portion overhanging said outer edge portions of the window and adhesively securing a second adhesive tape to the body structure around said trough,
   c. placing uncured adhesive material which is adherent to glass and metal in said trough, d. positioning said window in said trough and against said adhesive material, and pressing the outer portion of said tape against said second tape and with said perforated midportion allowing entrapped air and any excess adhesive material to pass therethrough upon the window being fully positioned in said trough, and e. removing said first tape and then said second tape after said adhesive material cures whereby said window glass is adhesively secured to said trough and is flush with adjacent portions of said vehicle body structure.

2. In a method for adhesively installing a fixed window to vehicle body structure which defines a window opening and a trough around the periphery of the opening for receiving adjacent edge portions of the window comprising steps of:

a. providing a tape having an inner portion with an adhesive on one side, an outer portion with an adhesive on one side and a midportion having a multiplicity of perforations therethrough and a parting agent on one side located between the inner and outer portions, b. adhesively securing the inner portion of said tape to the outer edge portions of the window and with the perforated inner portion and outer portions overhanging said outer edge portions of the window and adhesively securing a second adhesive tape to the body structure around said trough, c. positioning said window in said trough so as to be flush with the exterior body structure of the vehicle, d. pressing the outer portion of said tape up against said second tape and with said perforated midportion overlying a gap between the edge of the glass and the vehicle body structure, e. injecting an adhesive settable material which is adherent to glass and metal in the trough and with the elastomeric material flowing within the space between the edge of the glass and the vehicle body structure and against said perforated tape and with the perforations in the tape allowing entrapped air and any excess adhesive material to pass therethrough, f. removing said first and second tape after said adhesive material cures whereby the window glass is adhesively secured to the trough and is flush with the adjacent portions of the vehicle body structure.

3. In a method for adhesively installing a fixed window to a vehicle body structure, as defined in claim 1, and in which the adhesive material is uncured butyl rubber.

4. In a method for adhesively installing a fixed window to vehicle body structure, as defined in claim 2, and in which said settable adhesive material is uncured butyl rubber.

* * * * *